United States Patent
Cretors (10) Patent No.: US 10,631,563 B2
(45) Date of Patent: Apr. 28, 2020

(54) POPCORN MACHINE HAVING A FILTER PASSAGE INLET CONNECTED TO A KETTLE ASSEMBLY

(71) Applicant: C. Cretors & Company, Chicago, IL (US)

(72) Inventor: Charles D. Cretors, Lake Forest, IL (US)

(73) Assignee: C. Cretors & Company, Wood Dale, IL (US)

( * ) Notice: Subject to any disclaimer, the term of this patent is extended or adjusted under 35 U.S.C. 154(b) by 1720 days.

(21) Appl. No.: 13/866,896

(22) Filed: Apr. 19, 2013

(65) Prior Publication Data
US 2013/0276640 A1 Oct. 24, 2013

Related U.S. Application Data

(60) Provisional application No. 61/635,782, filed on Apr. 19, 2012.

(51) Int. Cl.
*A23L 7/187* (2016.01)

(52) U.S. Cl.
CPC .................. *A23L 7/187* (2016.08)

(58) Field of Classification Search
CPC ........ A23L 1/0082; A23L 1/0094; A23L 1/18; A23L 1/1812
USPC ..... 99/323.4, 323.5, 323.7, 323.9, 474, 476; 34/85, 87; 219/386, 392, 400; 426/233, 426/440, 450, 625
See application file for complete search history.

(56) References Cited

U.S. PATENT DOCUMENTS

| | | |
|---|---|---|
| 884,771 A | 4/1908 | Snow |
| 1,251,291 A | 12/1917 | Scheeffer |
| 1,308,241 A | 7/1919 | Scheeffer |
| 1,339,662 A | 5/1920 | Morgan |
| 1,436,400 A | 11/1922 | Mabey |
| 1,477,704 A | 12/1923 | Holcomb et al. |
| 1,501,114 A | 7/1924 | Howe |
| 1,525,966 A | 2/1925 | Vickers |
| 1,867,910 A | 7/1932 | Eakins |
| 1,880,822 A | 10/1932 | Cook et al. |

(Continued)

FOREIGN PATENT DOCUMENTS

| | | |
|---|---|---|
| DE | 8624682 | 12/1986 |
| DE | 20120429 | 7/2002 |

(Continued)

OTHER PUBLICATIONS

C. Cretors and Co.; "Diplomat" product manual for models DI20C, DI32C, DI20F, DI32F, DI205, TDI205, TDI206, DI325 and TDI326; 1996, 58 pages.

(Continued)

*Primary Examiner* — Phuong T Nguyen
(74) *Attorney, Agent, or Firm* — Perkins Coie LLP (57) ABSTRACT

Popcorn machines having popping kettles in direct fluid communication with exhaust ducts are described herein. The effluent produced as a byproduct of corn popping travels directly from the kettle into an exhaust system of the popcorn machine via an exhaust duct that extends through a kettle cover or lid. The exhaust systems can include one or more filters configured to remove smoke, odors, and/or other particulate matter before venting the effluent into the surrounding area as filtered exhaust.

11 Claims, 7 Drawing Sheets

(56) References Cited

U.S. PATENT DOCUMENTS

| | | |
|---|---|---|
| 1,961,812 A | 6/1934 | Burch |
| 1,987,388 A | 1/1935 | Cretors |
| 2,123,663 A | 7/1938 | Roach |
| 2,198,152 A | 6/1939 | Cooley |
| 2,232,954 A * | 2/1941 | Manley ............... A23L 1/1815 99/323.4 |
| 2,248,812 A | 7/1941 | Cretors |
| 2,467,866 A | 4/1949 | Smolderen et al. |
| 2,477,416 A | 7/1949 | Page |
| 2,537,744 A | 1/1951 | Cretors |
| 2,549,449 A | 4/1951 | Gibson |
| 2,570,126 A | 10/1951 | Hobbs |
| 2,586,347 A | 2/1952 | Kloster |
| 2,604,030 A | 7/1952 | Cretors |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Denniss |
| 2,907,264 A | 10/1959 | Bushway |
| 2,939,379 A | 6/1960 | Schmitt |
| 2,984,169 A | 5/1961 | Bushway |
| 3,095,326 A | 6/1963 | Green et al. |
| 3,120,168 A | 2/1964 | Lippert |
| 3,140,952 A | 7/1964 | Cretors |
| 3,156,451 A | 11/1964 | Waas |
| 3,280,720 A | 10/1966 | Kuhn |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley et al. |
| 3,568,782 A | 3/1971 | Cox |
| 3,650,199 A | 3/1972 | Sachnik |
| 3,697,289 A | 10/1972 | Day et al. |
| 3,739,953 A | 6/1973 | Cretors |
| 3,751,267 A | 8/1973 | Sachnik |
| 3,783,854 A | 1/1974 | Hurko et al. |
| 3,812,774 A | 5/1974 | Day et al. |
| 3,930,996 A | 1/1976 | Day et al. |
| 4,120,236 A | 10/1978 | Blomberg |
| 4,152,974 A | 5/1979 | Tienor |
| 4,165,620 A | 8/1979 | Gehauf nee Kiesel et al. |
| 4,173,925 A | 11/1979 | Leon |
| 4,178,843 A | 12/1979 | Crabtree et al. |
| 4,182,229 A | 1/1980 | VandeWalker |
| 4,206,695 A * | 6/1980 | Cretors ............... A23L 1/1815 99/323.9 |
| 4,288,686 A | 9/1981 | Cretors |
| 4,289,079 A | 9/1981 | Swistun |
| 4,331,124 A | 5/1982 | Seidel et al. |
| 4,337,584 A | 7/1982 | Johnson |
| 4,438,682 A | 3/1984 | King et al. |
| 4,494,314 A | 1/1985 | Gell |
| 4,512,247 A | 4/1985 | Friedman |
| 4,648,719 A | 3/1987 | Roben et al. |
| 4,649,263 A | 3/1987 | Goodlaxson |
| 4,702,158 A | 10/1987 | Ishihara |
| 4,750,276 A | 6/1988 | Smith et al. |
| 4,763,568 A | 8/1988 | Kiczek |
| 4,881,457 A | 11/1989 | Lyga et al. |
| 4,914,834 A | 4/1990 | Sime |
| 5,033,363 A | 7/1991 | King et al. |
| 5,035,173 A | 7/1991 | Stein et al. |
| 5,046,481 A | 9/1991 | Warwick |
| 5,069,923 A | 12/1991 | Hubbard et al. |
| 5,083,505 A | 1/1992 | Kohlstrung et al. |
| 5,154,161 A | 10/1992 | Rogers et al. |
| 5,180,898 A | 1/1993 | Alden et al. |
| 5,203,256 A | 4/1993 | Mueller |
| 5,263,405 A | 11/1993 | Simon |
| 5,301,601 A | 4/1994 | Cretors |
| 5,311,930 A | 5/1994 | Bruenn |
| 5,315,919 A | 5/1994 | Hoeberigs |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee et al. |
| 5,513,558 A | 5/1996 | Erickson et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,662,024 A | 9/1997 | Cretors et al. |
| 5,690,018 A | 11/1997 | Hansen |
| 5,694,830 A | 12/1997 | Hodgson et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,871,792 A | 2/1999 | Weiss et al. |
| 5,979,301 A | 11/1999 | Perttola |
| 6,000,318 A | 12/1999 | Weiss et al. |
| 6,098,526 A * | 8/2000 | Stein ............... A23L 1/1815 99/323.7 |
| 6,123,011 A | 9/2000 | Cretors |
| 6,133,549 A | 10/2000 | Shih et al. |
| 6,164,192 A | 12/2000 | Stein et al. |
| 6,164,193 A | 12/2000 | Perttola |
| 6,234,063 B1 | 5/2001 | Evers et al. |
| 6,374,727 B1 | 4/2002 | Cretors |
| 6,382,087 B1 | 5/2002 | Iiyama |
| 6,412,395 B1 | 7/2002 | Weiss et al. |
| 6,412,396 B1 | 7/2002 | Wright |
| 6,460,451 B1 | 10/2002 | Helman et al. |
| 6,461,033 B2 | 10/2002 | Palmer et al. |
| 6,534,103 B2 | 3/2003 | Weiss |
| 6,578,468 B1 | 6/2003 | Horn |
| 6,612,225 B1 | 9/2003 | Mann |
| 6,669,304 B2 | 12/2003 | Binning |
| 6,672,201 B2 | 1/2004 | Evans, Sr. et al. |
| 6,872,923 B2 | 3/2005 | Cretors et al. |
| 6,914,226 B2 | 7/2005 | Ottaway |
| 7,024,986 B2 | 4/2006 | Kurosawa |
| 7,285,300 B1 | 10/2007 | Allington et al. |
| 7,846,493 B1 | 12/2010 | Cox |
| 7,874,244 B1 * | 1/2011 | Rhome ............... 99/323.5 |
| 8,011,622 B1 | 9/2011 | Guthrie |
| 8,201,492 B2 | 6/2012 | Cretors |
| 8,464,634 B2 | 6/2013 | Cretors et al. |
| 8,651,014 B2 | 2/2014 | Vidojevic et al. |
| 8,794,129 B2 | 8/2014 | Cretors |
| 8,869,679 B2 | 10/2014 | Ryan et al. |
| 9,144,247 B2 | 9/2015 | Cretors |
| 2002/0034567 A1 | 3/2002 | Jacobsen et al. |
| 2002/0147006 A1 | 10/2002 | Coon et al. |
| 2003/0159591 A1 | 8/2003 | Evans et al. |
| 2003/0168438 A1 * | 9/2003 | Zhou ............... A47J 37/0835 219/386 |
| 2004/0026404 A1 | 2/2004 | Lerner |
| 2004/0045444 A1 | 3/2004 | Mann |
| 2004/0074397 A1 | 4/2004 | Calhoun |
| 2004/0265993 A1 | 12/2004 | Darling et al. |
| 2005/0056154 A1 | 3/2005 | Fu |
| 2009/0041915 A1 | 2/2009 | Biechteler |
| 2009/0056558 A1 | 3/2009 | Cretors et al. |
| 2009/0126579 A1 * | 5/2009 | Cretors ............... A23L 1/1815 99/323.11 |
| 2009/0208621 A1 | 8/2009 | Dotan |
| 2009/0223378 A1 | 9/2009 | Cretors |
| 2010/0270282 A1 * | 10/2010 | Fernandez ............... F24C 7/06 219/392 |
| 2011/0014340 A1 * | 1/2011 | Spitzley ............... A47J 31/20 426/433 |
| 2011/0027434 A1 | 2/2011 | Cretors |
| 2011/0076372 A1 | 3/2011 | Cretors |
| 2011/0076373 A1 | 3/2011 | Cretors et al. |
| 2011/0083562 A1 | 4/2011 | Ryan et al. |
| 2011/0120317 A1 | 5/2011 | Rhome |
| 2011/0200727 A1 | 8/2011 | Biechteler |
| 2012/0266756 A1 | 10/2012 | Cretors |
| 2013/0022727 A1 | 1/2013 | Sherwin |

(56) References Cited

U.S. PATENT DOCUMENTS

| | | |
|---|---|---|
| 2013/0276641 A1 | 10/2013 | Vidojevic |
| 2013/0280386 A1 | 10/2013 | Cretors |
| 2015/0064320 A1 | 3/2015 | Cretors |

FOREIGN PATENT DOCUMENTS

| | | | | |
|---|---|---|---|---|
| EP | 0364071 | | 4/1990 | |
| FR | 2401387 | | 3/1979 | |
| GB | 0688223 | | 3/1953 | |
| GB | 717654 A | * | 10/1954 | ......... B01D 29/0013 |
| JP | S-59135849 A | | 8/1984 | |
| JP | 2006081587 A | | 3/2006 | |
| WO | WO-9310698 | | 6/1993 | |
| WO | WO-9706699 | | 2/1997 | |
| WO | WO-2004054384 | | 7/2004 | |
| WO | WO-2012145717 | | 10/2012 | |

OTHER PUBLICATIONS

C. Cretors and Co.; "Diplomat" product manual for models DI20CP, DI32CP, DI20FP and DI32FP; 1989, 62 pages.

C. Cretors and Co.; Multi-product sell sheet for "The New Diplomat Counter Showcase" and "Thunder Kettle" for models G48E, EPR48E5 and PR48E5; dated 1990, 2 pages.

Gold Medal Products Co.; "Funfood Equipment & Supplies" catalog; vol. 56, dated 2000, 108 pages.

Loeb Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, (missing all even numbered pages) 33 pages.

Cretors Coater Mixer Tumbler, http://www.cretors.com/store/catalog.asp?item=39&category_id=3, Copyright 2014, 1 page.

International Search Report and Written Opinion for PCT/US2008/075083; dated Nov. 12, 2008; Applicant: C. Cretors and Company, 8 pages.

International Search Report and Written Opinion; PCT/EP05/009010, dated Jan. 5, 2006, Applicant: Pfister and Pfister, 6 pages.

International Search Report and Written Opinion; PCT/US10/50442, dated Nov. 23, 2010, Applicant: C. Cretors & Company, 10 pages.

Suspended Poppers: 20 oz., 32 oz., 48 oz., 60 oz., C. Cretors and Company, published Nov. 2004, 6 pages.

Topping & Dispensing Systems, C. Cretors and Company Product Brochure, pp. 36-39, published Oct. 2005, 5 pages.

Topping Systems, C. Cretors and Company, published Nov. 2003, 2 pages.

International Search Report and Written Opinion, PCT/US2012/03459, dated Sep. 20, 2012, 7 pages.

"How to Succeed in the Caramel Corn Business," Gold Medal Products Company, Copyright 2011, gmpopcorn.com, 24 pages.

* cited by examiner

POPCORN MACHINE HAVING A FILTER PASSAGE INLET CONNECTED TO A KETTLE ASSEMBLY

CROSS-REFERENCE TO RELATED APPLICATION

This patent application claims the benefit under 35 U.S.C. § 119 of U.S. Provisional Patent Application Ser. No. 61/635,782; filed Apr. 19, 2012; and titled POPCORN MACHINE HAVING A FILTER PASSAGE INLET CONNECTED TO A KETTLE ASSEMBLY, the disclosure of which is incorporated herein by reference in its entirety.

TECHNICAL FIELD

The following disclosure relates generally to popcorn machines having kettle assemblies with connected exhaust systems and associated devices and methods.

BACKGROUND

The process of popping corn involves applying heat to convert water in the interior of a corn kernel into steam. Raw corn kernels and cooking oil are placed in a popcorn kettle of a popcorn machine and heated. When the corn kernels reach a sufficiently hot temperature, they can explode due to a high internal pressure caused by transformation of the interior water into steam. These explosions can be violent and can propel popped kernels, raw kernels, and residual oil upward. A significant amount of steam may be generated as well as the interior water makes up approximately ⅐ of the weight of raw corn kernels.

The kettle can include a cover that confines the popped corn, unpopped kernels, oil, and steam in the kettle until a layer of popped corn accumulates. After sufficient accumulation of the popped corn, the cover may be lifted by manual or automatic mechanical means, allowing the popped corn to collect in a cabinet in which the kettle is contained. The lifting of the cover also allows the steam and the oil vapor to rise above a bed of the popped corn in the kettle and escape into the adjacent space in the popcorn machine.

DETAILED DESCRIPTION

The following disclosure describes various embodiments of popcorn machines having kettles with connected duct exhaust systems and associated devices and methods. Certain details are set forth in the following description and in FIGS. 1A-6B to provide a thorough understanding of various embodiments of the disclosure. Those of ordinary skill in the relevant art will appreciate, however, that the technology disclosed herein can have additional embodiments that may be practiced without several of the details described below and/or with additional features not described below. In addition, some well-known structures and systems often associated with popcorn machines and methods of making popcorn have not been shown or described in detail below to avoid unnecessarily obscuring the description of the various embodiments of the disclosure.

The dimensions, angles, features, and other specifications shown in the figures are merely illustrative of particular embodiments of the disclosure. Accordingly, other embodiments can have other dimensions, angles, features, and other specifications without departing from the scope of the present disclosure. In the drawings, identical reference numbers identify identical, or at least generally similar, elements.

Figure 1A:
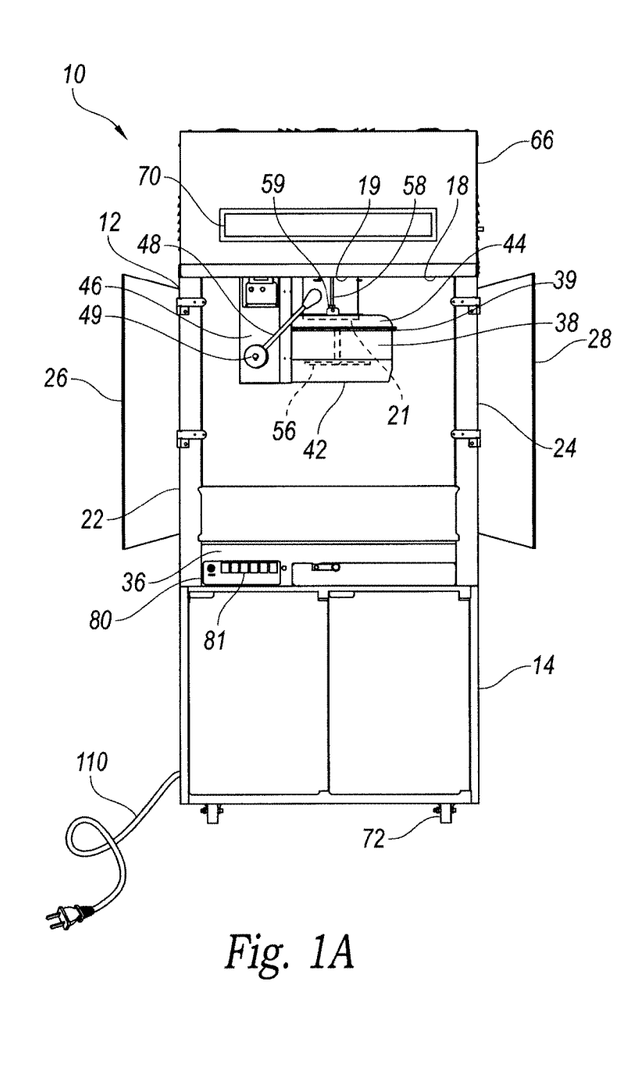
FIGS. 1A and 1B are front and side views, respectively, of a popcorn machine configured in accordance with an embodiment of the present disclosure.
Figure 1B:
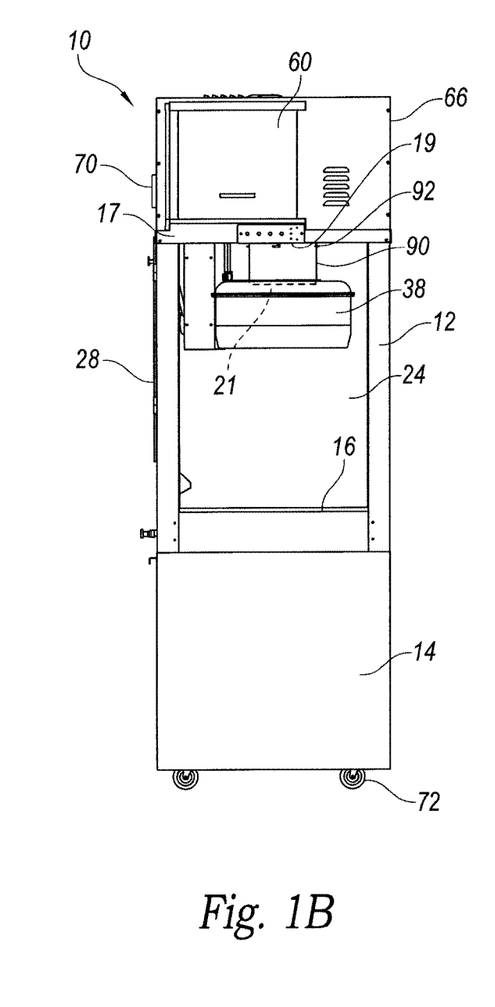

FIGS. 1A and 1B are front and side views, respectively, of a popcorn machine 10 configured in accordance with the present disclosure. In the illustrated embodiment, many features of the popcorn machine 10 can be at least generally similar in structure and function to corresponding features of the C. Cretors Co. Diplomat machine, provided by the C. Cretors Co. of Chicago, Ill., and similar popcorn machines described in U.S. Pat. Nos. 5,662,024; 6,234,063; and 6,374,727; each of which is incorporated herein in its entirety by reference. In other embodiments, various aspects and features of the present disclosure can be used with other popcorn machines.

The popcorn machine 10 includes a popcorn cabinet or case 12 and a storage section 14. The storage section 14 can be used to store supplies (e.g., extra popping kernels, oil, containers, etc.). The popcorn case 12 includes a bottom shelf 16, a top wall 18, a rear panel 20, and a pair of opposing side walls 22 and 24. The rear panel 20 and the side walls 22 and 24 can be made of tempered glass, Plexiglas or another suitable transparent material to allow viewing of the popping process and the popped corn collecting in the popcorn case 12. A pair of hinged doors 26 and 28 provide access to the popcorn case 12 to allow an operator to carry out cooking operations and to dispense popcorn. The hinged doors 26 and 28 can made of, for example, Plexiglas or another suitable material (e.g., glass, heat-resistant plastic, etc.).

The popcorn case 12 can include a hot air conditioner (not shown) mounted under the bottom shelf 16 and between the popcorn case 12 and the storage section 14. The hot air conditioner can include a blower and a heating element that operate together to force hot air through the popped corn in the popcorn case 12 to keep it warm until it is ready to be served. In some embodiments, the conditioner can be a one pass conditioner, wherein air is heated to keep the popped corn warm and then allowed to escape. In other embodiments, however, the conditioner can include a recirculation system in which the air and/or heat from the air can be vented and/or ducted to return to the conditioner for reuse. A control unit 36 is mounted under the bottom shelf 16 between the popcorn case 12 and the storage section 14. The control unit 36 can be electrically connected to and can control, for example, several components of the popcorn machine 10 described below.

A kettle assembly 37 including a kettle 38 for receiving popcorn kernels is suspended from the top wall 18 of the popcorn case 12. A support column 46 extending from the top wall 18 of the popcorn case 12 supports a kettle dump handle 48. A coupling rod 49 extends through the column 46 and couples the kettle 38 to the handle 48, allowing the operator to rotate the handle 48 downwardly to tip the kettle 38 and discharge popped corn into the popcorn case 12. The kettle 38 can be constructed of, for example, stainless steel and may include heating elements that can heat oil in the kettle 38 to pop the corn kernels placed therein. A thermocouple 42 fixedly attached to the kettle 38 and operably coupled to the control unit 36 measures the temperature of the kettle 38. In some embodiments (as described in more detail below with reference to FIG. 2A) the kettle 38 may also include an agitator 56 operationally coupled to a motor by a drive shaft that extends through the top wall 18.

The kettle assembly 37 further includes a circular kettle cover 44 configured to rest upon a kettle top 39 to cover the kettle 38 while the kernels are heated and/or popping. The kettle cover 44 is operably coupled to a cover lift rod 58, which is operationally coupled to a spring loaded hinge assembly (positioned above the top wall 18 and not shown in FIGS. 1A and 1B) to allow the kettle cover 44 to automatically lift off of the kettle 38 and toward the top wall 18 when the popped corn overflows from the kettle 38 in an upward direction. Operation of the spring loaded hinge assembly is described in greater detail below with reference to FIGS. 3A and 3B.) The operator may also raise the kettle cover 44 by pushing upwardly on a knob 59 attached to cover lift rod 58. In this way, the operator can manually lift the kettle cover 44 to allow access to the kettle 38 to, for example, add popcorn kernels and/or oil.

An exhaust duct 90 extends from an opening 19 in the top wall 18 and is releasably attached thereto by one or more support pins 92. As explained in further detail below with reference to FIG. 2A, the duct 90 is sufficiently long to enable an inlet 21 at a distal end of the duct 90 to extend through an opening of the kettle cover 44 to allow effluent containing byproducts of the corn popping process (e.g., smoke, oil droplets, etc.) to flow into the duct 90. An exhaust unit 60 includes a fan (not shown in FIGS. 1A and 1B) that draws the effluent into the duct 90 through the inlet 21 and the opening 19. In some embodiments, as discussed in more detail with reference to FIGS. 6A and 6B, the opening 19 can include a screen having a plurality of apertures configured to prevent relatively large particles and/or popped corn kernels. The effluent then passes through a series of filters (also not shown in FIGS. 1A and 1B) before discharging filtered exhaust through an outlet vent in an upper surface of the popcorn machine 10.

An exhaust unit cover 66 mounted on the top wall 18 includes a light 70 and at least partially surrounds the exhaust unit 60. As described in more detail with reference to FIG. 5, a filter assembly is included in the exhaust path to reduce undesirable odors and airborne oils from the area around the popcorn machine 10. The filter assembly can include one or more filters such as, for example, a grease filter, an electrostatic filter, a charcoal filter, and/or a high-efficiency particulate air (HEPA) filter. In one embodiment, the filter assembly and other portions of the exhaust unit 60 can be a ventless hood system, such as for example a Giles model OVH-10 manufactured by Giles Enterprises, Inc., Montgomery, Ala. In other embodiments, other types of suitable filter assemblies can be used.

The control unit 36 can include a control panel 80 having a variety of buttons, switches, controls, and/or displays, and can be configured to automatically complete various operations of the popcorn machine 10. For example, the control unit 36 can turn off power to the heating elements after a predetermined amount of time or after a predetermined temperature has been reached (e.g., as measured by the thermocouple 42). The control unit 36 can turn off power to the agitator 56 and/or the exhaust unit 60 after a predetermined time, and can provide an indication on the touch screen 81 that the popping cycle is complete.

A user can operate various components of the popcorn machine 10 via the control panel 80. For example, the control panel 80 can include a variety of buttons, indicators, displays, touch screens, lights and/or other suitable components that a user can interact with to operate the popcorn machine 10. For example, in operation, a user can press a Start Button when the user is ready to begin popping. Pressing the Start Button can initiate a variety of functions on the popcorn machine 10. For example, the heating elements can be energized to begin heating the corn kernels, the agitator 56 can be activated to agitate the corn kernels and/or the exhaust unit 60 can be activated to remove odors, oil and/or particulates.

A power cord 110 connected to the control unit 36 provides the popcorn machine 10 with the necessary electrical power to operate the various components. The power cord 110 may be, for example, a three line power cord that can be plugged into a power source (e.g., a 120/208/60 outlet). A plurality of wheels or casters 72 may be attached to the bottom of the popcorn machine 10, allowing it to move thereon.

Figure 2A:
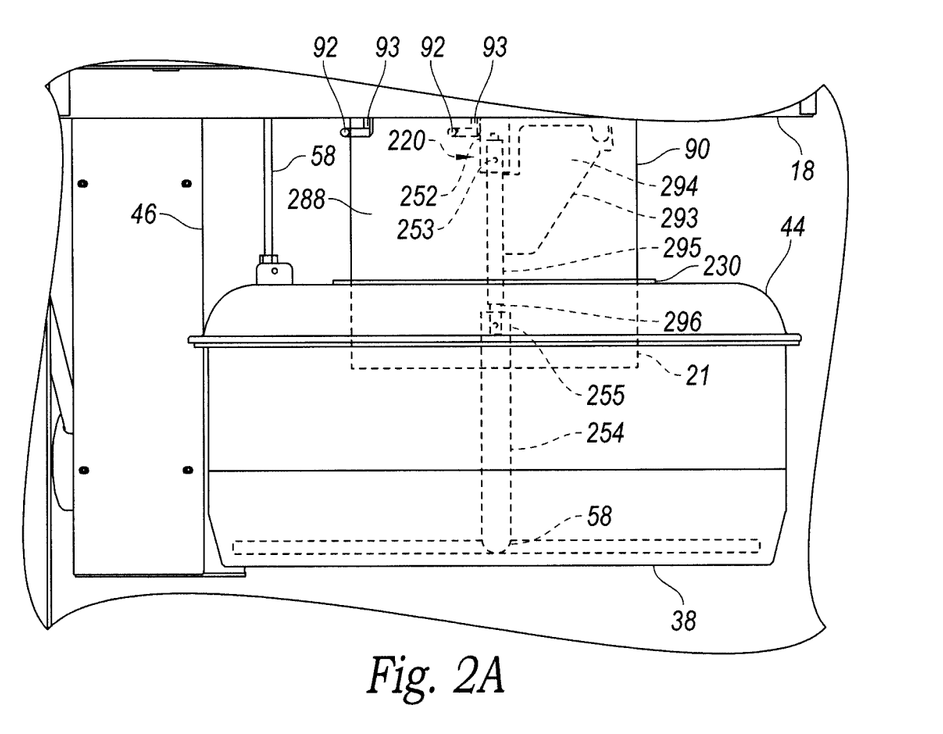
FIG. 2A is an enlarged side view of a popcorn kettle configured in accordance with an embodiment of the present disclosure.

FIG. 2A is an enlarged isometric view of the kettle 38 configured in accordance with an embodiment of the present disclosure. The duct 90 extends from the opening 19 through a center opening 230 of the kettle cover 44 into the kettle 38, allowing effluent produced during the corn popping process to flow into the duct 90 through the inlet 21. Each of the one or more support pins 92 is rigidly mounted to the top wall 18 and slidably engages a corresponding L groove 93 in the duct 90 to removably attach the duct 90 to the top wall 18. A drive shaft 252 having a drive shaft hole 253 is operationally coupled to a motor (not shown) disposed above the top wall 18. The drive shaft 252 extends downwardly through the top wall 18 into a center portion 288 of the duct 90. A removable attachment clip 220 removably attaches a rod 295 having a scraper 293 to the drive shaft 252.

Figure 2B:
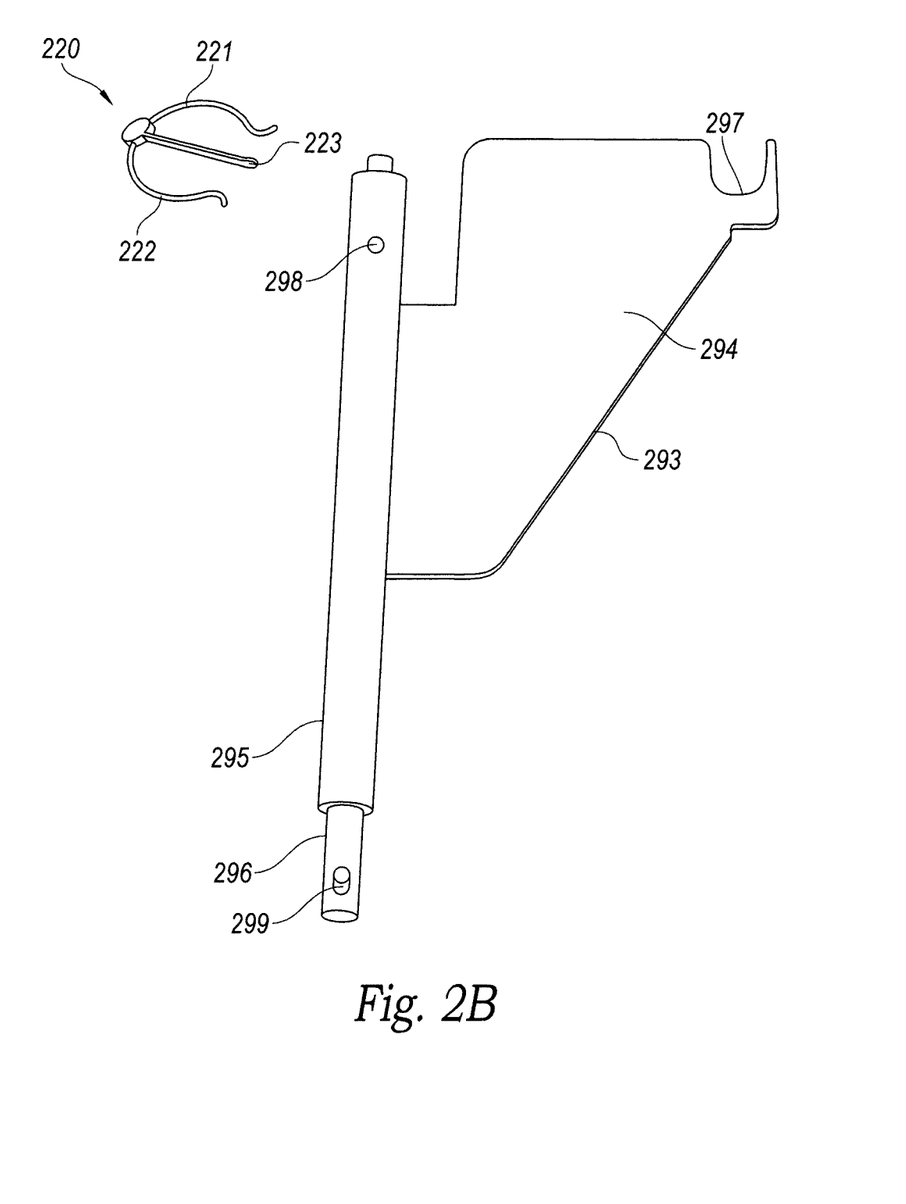
FIG. 2B is an enlarged isometric view of an exhaust screen scraper configured in accordance with an embodiment of the present disclosure.

FIG. 2B is an enlarged side view of the scraper 293 configured in accordance with an embodiment of the disclosure. In the illustrated embodiment, the scraper 293 includes a paddle portion 294 having a notch 297. The paddle portion 294 is rigidly attached to the rod 295, which is fixedly attached to the drive shaft 252 by the clip 220. The clip 220 includes a first arm 221 and a second arm 222 configured to circumferentially surround the drive shaft 252 while a pin 223 slides through a scraper rod hole 298 aligned with the drive shaft hole 253 when a top portion of the rod 295 is inserted into the drive shaft 252 (FIG. 2). When attached to the drive shaft 252, the scraper 293 rotationally sweeps around the interior of the duct 90 allowing the paddle portion 294 to scrape the bottom surface of the opening 19 into the exhaust unit 60 and clear any large particulate matter (e.g., popcorn, etc.) drawn upward by the exhaust air that is excessively large to fit through openings or holes in the opening 19. In some embodiments, for example, the scraper 293 is made from metal (e.g., stainless steel or aluminum) while in other embodiments, the scraper 293 is made of any suitable heat-resistant rigid material (e.g. polycarbonate).

The rod 295 includes a lower portion 296 having a smaller diameter than the rest of the rod 295 and configured to engage an upper portion of the agitator rod 254 (FIG. 2A). In the illustrated embodiment, a spring-loaded pin 299 on the lower portion 296 releasably engages a hole 255 on the agitator rod 254, thereby securely attaching the agitator 56 to the rod 295. To disengage the agitator 56 from the scraper 293, a user may apply inward force on the spring-loaded pin 299 causing it to retract from the hole 255 to within the lower portion 296. In other embodiments, the agitator 56 may be coupled to the rod 295 with one of many suitable alternative attachment methods and/or devices. For example, the agitator 56 may be attached to the rod 295 with a spring-loaded twist and lock feature (similar to the way, for example, a mixing blade is attached to a conventional kitchen stand mixer).

Figure 3A:
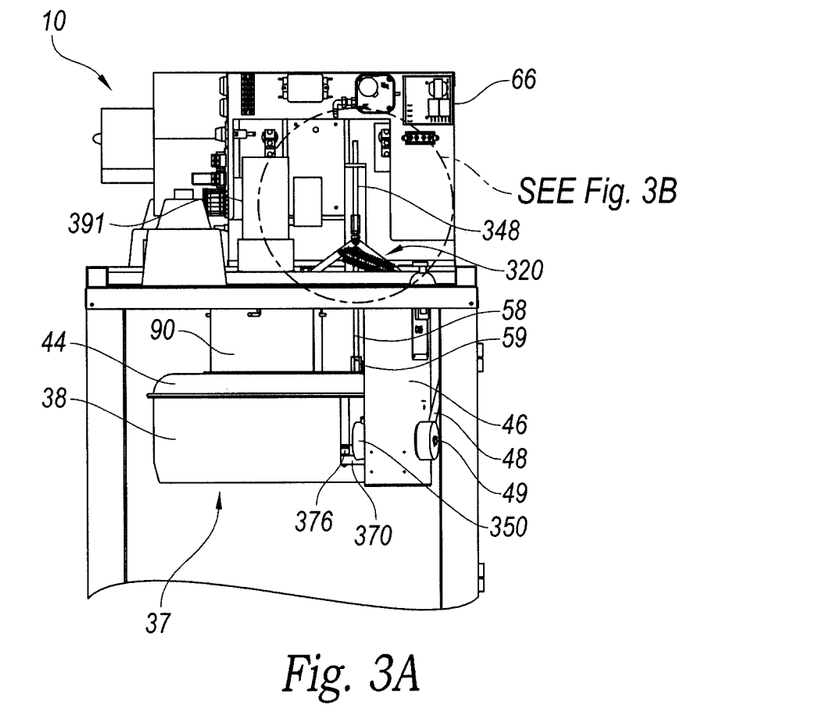
FIG. 3A is a cutaway side view of an upper portion of the popcorn machine of FIGS. 1A and 1B configured in accordance with an embodiment of the present disclosure.
Figure 3B:
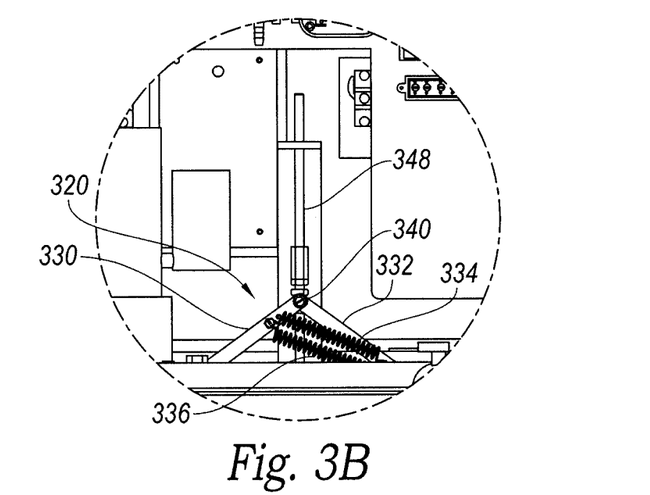
FIG. 3B is an enlarged view of a portion of FIG. 3A showing a kettle cover lifting assembly configured in accordance with an embodiment of the present disclosure.

FIG. 3A is a cutaway side view of an upper portion of the popcorn machine 10 and FIG. 3B is an enlarged cutaway view of a portion of FIG. 3A showing a motor 391 configured to rotate a drive shaft 252 (FIG. 2A), and a spring-loaded cover-lifting system 320 configured in accordance with an embodiment of the present disclosure. Referring to both FIGS. 3A and 3B, the cover-lifting system 320 is disposed inside the exhaust unit 60. The cover-lifting system 320 includes a first linkage or arm 330 and a second arm 332 pivotally coupled to an upper portion 348 of the cover lift rod 58 at a pivot 340. In the illustrated embodiment, opposing ends of a first biasing member or tension spring 334 and a second spring 336 are each attached to the first arm 330 and second arm 332. In other embodiments, the cover-lifting system 320 may include only one spring or may comprise three or more springs. As the cover lift rod 58 moves vertically up and down, the coils of the first spring 334 and the second spring 336 horizontally contract and extend, respectively.

The cover-lifting system 320 is configured to keep the kettle cover 44 on the kettle 38 during a portion of the corn popping operation and to allow the kettle cover to slide vertically when lifted. When the kettle cover 44 rests on the kettle 38 (as shown in FIG. 3A), the first spring 334 and the second spring 336 are more extended than when, for example, the kettle cover 44 is lifted by an operator above the kettle 38. Greater elongation of the coils of the first spring 334 and the second spring 336 generally corresponds to a greater tension in the springs. A tendency of each of the first spring 334 and the second spring 336 is to contract to a resting state, thereby bringing the first arm 330 and the second arm 332 closer to one another and causing the cover lift rod 58 to move upward. The cover-lifting system 320 can be configured to counteract this tendency of the first spring 334 and the second spring 336 to return to the resting state by requiring a certain threshold of lifting force before the first arm 330 and the second arm 332 can be moved.

For example, in one embodiment (not shown), each of the distal ends of the first arm 330 and the second arm 332 respectively may include first and second distal end pins configured to slide in and/or on a horizontal groove (not shown). Each end portion of the groove may include a depression in which the respective pins rest when the kettle cover 44 rests on the kettle 38 and the first spring 334 and the second spring 336 are at a maximum elongation. A small vertical movement of the cover lift rod 58 can cause the pivot 340 to correspondingly move upward. Vertical movement of the pivot 340 causes the first arm 330 and the second arm 332 to also move upward. The respective pins are resultingly displaced from their respective depressions and may freely move through the horizontal groove. The first spring 334 and the second spring 336 are thus allowed to contract to their respective resting states, thereby bringing the first arm 330 and the second arm 332 together and forcing the pivot 340 rapidly upward. The resulting upward movement of the pivot 340 causes the cover lift rod 58 to rapidly raise the kettle cover 44 off of the cover. Thus, a small upward vertical motion of the kettle cover 44 (e.g., when the kettle 38 overflows with popped corn and/or when the operator moves the knob 59 upward to lift the kettle cover 44) can automatically cause the kettle cover 44 to quickly rise above (or "jump up" from) the kettle 38, permitting easier access thereof by the operator and/or clearance to rotate the kettle 38 for emptying.

Referring to FIG. 3A, the handle 48 is rotationally coupled to a pivot 350 on the column 46. The pivot 350 is operationally coupled to the kettle 38 by a kettle pivot rod 370 inserted into a receptacle 376 in the kettle 38. When the operator pulls downward on the handle 48, the pivot rod 370 revolves about the pivot 350, thereby causing the kettle 38 to rotate downwardly about the pivot rod 370 to, for example, empty the kettle 38 of popped corn, unpopped kernels and/or other debris associated with the popping of corn.

Figure 4A:
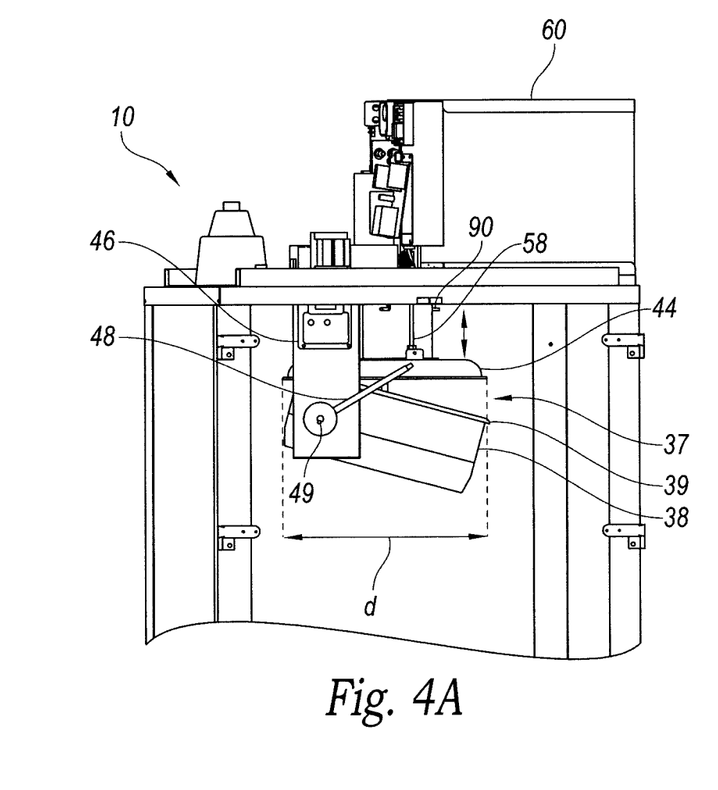
FIGS. 4A and 4B are front views of an upper portion of the popcorn machine of FIGS. 1A and 1B with the kettle assembly shown in two stages of emptying in accordance with an embodiment of the present disclosure.
Figure 4B:
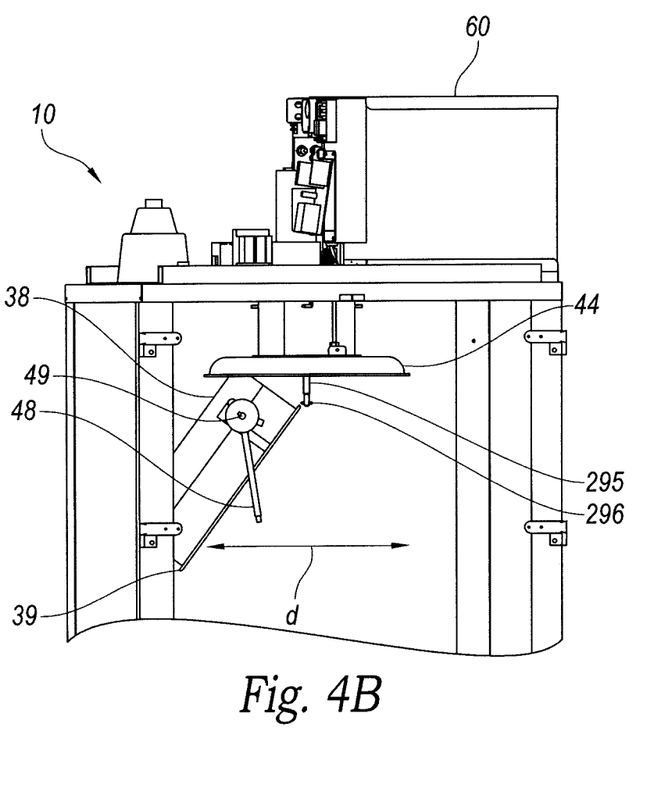

FIGS. 4A and 4B are a front views of an upper portion of the popcorn machine 10 with the exhaust unit cover 66 removed. FIG. 4A shows the popcorn machine 10 after an operator has pulled the handle 48 downwardly in a clockwise direction providing partial access to the kettle 38. FIG. 4B shows the popcorn machine 10 after the operator has rotated the handle 48 clockwise to its fullest extent providing full access to the kettle 38 (the column 46 is removed from FIG. 4B for clarity).

As shown in FIGS. 4A and 4B, the kettle 38 is configured to be substantially horizontally positioned within a diameter d of the kettle cover 44 (e.g., through placement of the kettle pivot rod 370 (FIG. 3A) in the kettle 38, the placement of the column 46, etc) when the kettle 38 is fully retracted (see FIG. 3A). Positioning all or a substantial portion of the kettle top 39 within the diameter d allows the effluent from the popping process (e.g., smoke, particulate matter, and/or other byproducts of corn popping in the kettle 38) to flow directly into the duct 90 and the exhaust unit 60. Even when the kettle 38 is partially tipped open, for example, a substantial portion of the effluent is still ducted into the exhaust unit 60 reducing odors, smoke, and/or other byproducts of popping corn that escape into the surrounding area.

Figure 5:
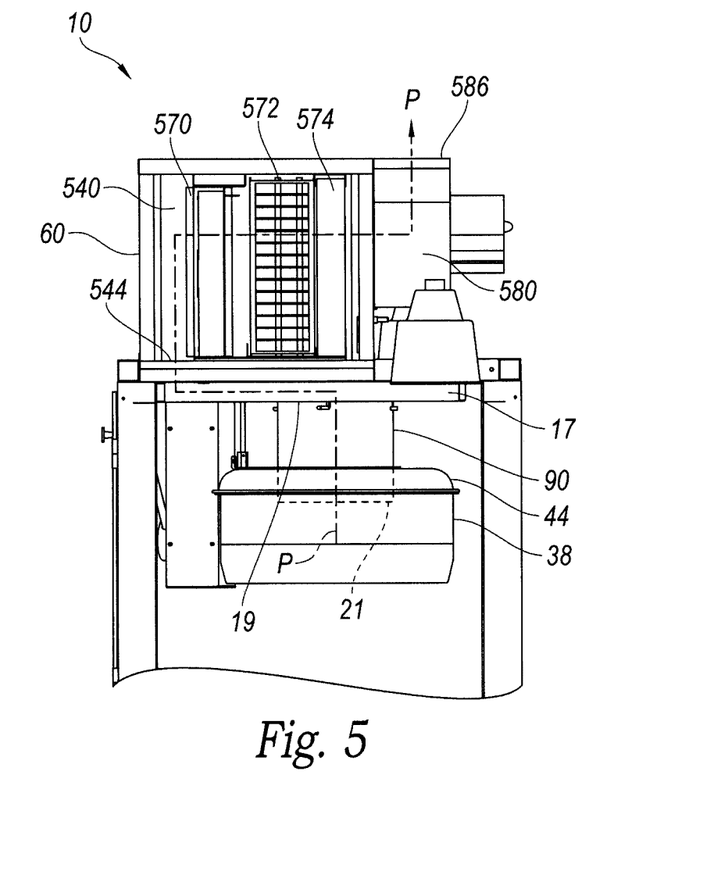
FIG. 5 is a cutaway side view of the popcorn machine of FIGS. 1A and 1B illustrating an exhaust flow path into and through an exhaust unit configured in accordance with an embodiment of the present disclosure.

FIG. 5 is a side view of the popcorn machine 10 illustrating an exhaust airflow path P into and through the exhaust unit 60 in accordance with an embodiment of the present disclosure. In operation an air mover or fan assembly 580 (not shown) draws air through the exhaust unit 60 along the flow path P. Effluent flows from the kettle 38 into the duct 90 through an inlet 21 and into a plenum 17 (described in more detail below with reference to FIG. 6). The effluent travels horizontally through the plenum 17 along the flow path P and through a filter cavity inlet 544 in the bottom wall of a filter cavity 540. The filter cavity 540 is configured to house one or more air filters for removing particulate matter, odors, grease, etc. from the effluent. For example, a first filter 570 (e.g., a baffle filter) may be configured to, for example, remove grease particles from the effluent. A second filter 572 (e.g., an electronic ionizing air cleaner) may be configured to, for example, remove smoke and grease vapor generated in the kettle 38 by the corn popping process. A third filter 574 (e.g., a charcoal filter) may be configured to remove odors from the remaining effluent. After passing through the filters 570, 572 and 574 the filtered exhaust air continues along path P through the fan assembly 580 and an exhaust outlet 586 into the room containing the popcorn machine 10. In some embodiments, the order of the filters 570, 572 and 574 may be different than described above. In other embodiments, only one of the filters 570, 572 and 574 may be installed during normal operations. In some other embodiments more than three air filters may be employed in the filter cavity 540 in the exhaust unit 60.

The exhaust unit 60 illustrated in the embodiment of FIG. 5 and described above is merely one example of an exhaust air system to remove effluent from the kettle 38. As noted above with reference to FIGS. 1A and 1B, the filter assembly and other portions of the exhaust unit 60 can be a ventless hood system, such as for example a Giles model OVH-10 manufactured by Giles Enterprises, Inc., Montgomery, Ala. In some embodiments, for example, the exhaust unit 60 may have a different internal configuration than the embodiment of FIG. 5. In other embodiments, the exhaust unit 60 may include an outlet exhaust duct downstream of the exhaust outlet 586 to vent the filtered exhaust air to the outdoors. In certain other embodiments, the outlet exhaust duct may be connected to the hot air re-circulating conditioner (described above with reference to FIGS. 1A and 1B) to, for example, recover at least a portion of the heat contained in the filtered exhaust air. In further embodiments, the exhaust unit 60 may be located remotely from the popcorn machine 10 (e.g., on the roof of a building and/or in a mechanical room).

Figure 6A:
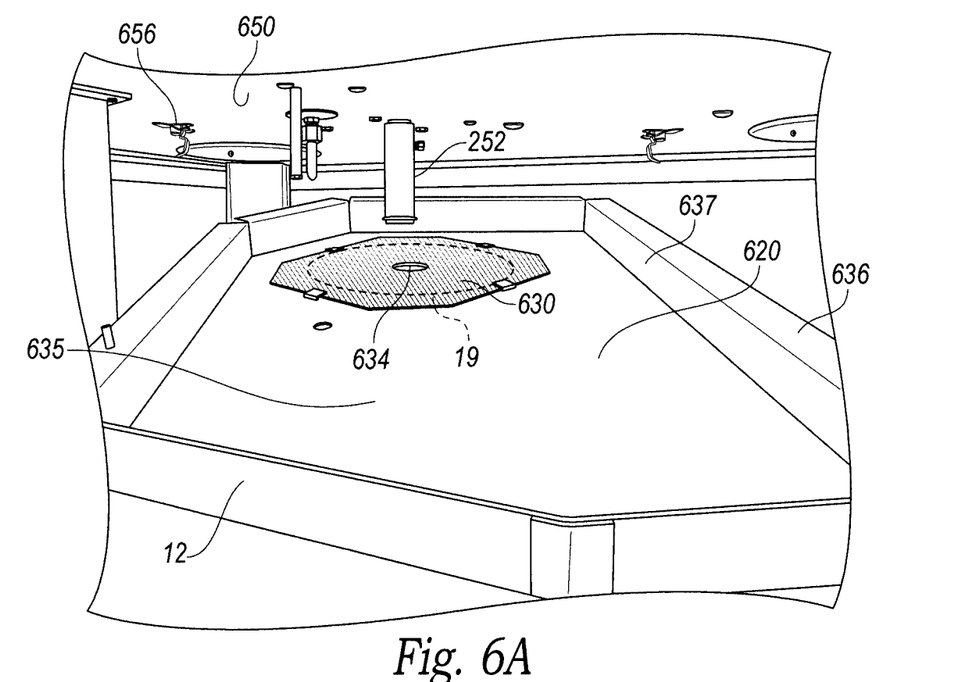
FIGS. 6A and 6B are isometric views of an exhaust air plenum of the popcorn machine of FIGS. 1A and 1B configured in accordance with an embodiment of the present disclosure.
Figure 6B:
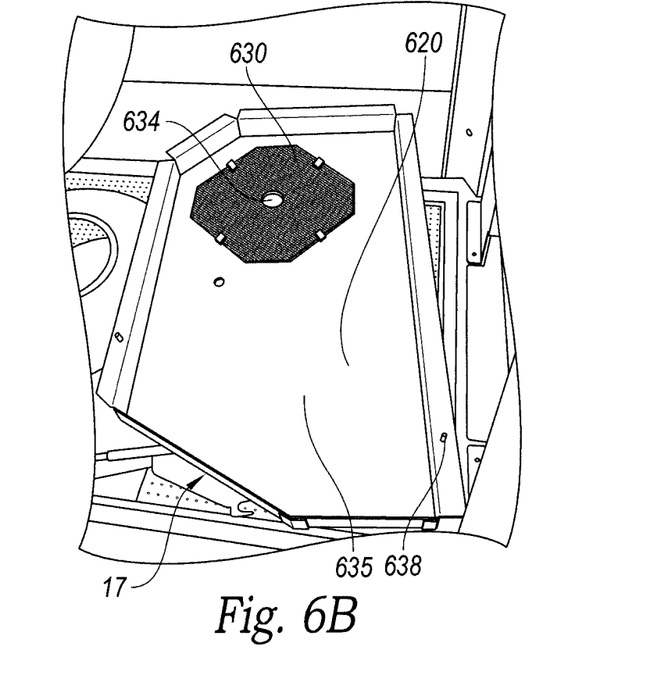

FIGS. 6A and 6B are isometric views of the plenum 17 of the popcorn machine 10 configured in accordance with an embodiment of the present disclosure. The plenum 17 is shown spaced apart from the an under surface 650 of the exhaust unit 60 for ease of illustration. Referring to FIGS. 6A and 6B together, the plenum 17 includes a plurality of sidewalls 637 joined to a bottom panel 635. The plenum 17 can be made of a suitable material (e.g. stainless steel, sheet metal, etc.). A lip 636 extends along at least a portion of the perimeter of the plenum 17 and facilitates attachment thereof to an underside surface 650 of the exhaust unit 60 using one or more suitable attachment features 656 (e.g., a clip, a screw, etc.). One or more alignment pins 638 on the lip 636 are configured to be inserted into holes (not shown) in the underside surface 650 and aid in proper alignment of the plenum 17. An exhaust enclosure 620 is formed when the plenum 17 is attached to the underside surface 650 of the exhaust unit 60 allowing the effluent and other unfiltered exhaust air to travel therethrough en route to the filter cavity 540. An inlet screen 630 includes a plurality of apertures configured to prevent relatively large particles and/or popped corn kernels from entering the plenum 17 via the opening 19. An aperture 634 allows the drive shaft 252 to pass through the inlet screen 630 when the plenum 17 is installed. The effluent can travel through the plenum 17 into the filter cavity 540 through the filter cavity inlet 544 (FIG. 5) before being filtered by and discharged from the exhaust unit 60 by the fan assembly 580.

The foregoing description of embodiments of the invention is not intended to be exhaustive or to limit the disclosed technology to the precise embodiments disclosed. While specific embodiments of, and examples for, the invention are described herein for illustrative purposes, various equivalent modifications are possible within the scope of the invention, as those of ordinary skill in the relevant art will recognize. For example, although certain functions may be described in the present disclosure in a particular order, in alternate embodiments these functions can be performed in a different order or substantially concurrently, without departing from the spirit or scope of the present disclosure. In addition, the teachings of the present disclosure can be applied to other systems, not only the representative popcorn machine devices and methods described herein. Further, various aspects of the invention described herein can be combined to provide yet other embodiments.

All of the references cited herein are incorporated in their entireties by reference. Accordingly, aspects of the invention can be modified, if necessary or desirable, to employ the systems, functions, and concepts of the cited references to provide yet further embodiments of the disclosure. These and other changes can be made to the invention in light of the above-detailed description. In general, the terms used in the following claims should not be construed to limit the invention to the specific embodiments disclosed in the specification, unless the above-detailed description explicitly defines such terms. Accordingly, the actual scope of the disclosure encompasses the disclosed embodiments and all equivalent ways of practicing or implementing the disclosure under the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

From the foregoing, it will be appreciated that specific embodiments of the disclosed technology have been described herein for purposes of illustration, but that various modifications may be made without deviating from the invention. Certain aspects of the disclosure described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the disclosed technology. Accordingly, the disclosure and associated technology can encompass other embodiments not expressly shown or described herein. The invention is not limited, except as by the claims.

I claim:

1. A popcorn machine, comprising:
   a case having an interior portion that includes a top wall having an opening therein;
   a support extending downwardly from the top wall;
   a kettle operationally coupled to the support, wherein the kettle is configured to receive and heat popcorn kernels;

a kettle lid removably disposed proximate an upper portion of the kettle and configured to cover the kettle during popcorn kernel heating, wherein the lid includes an aperture therethrough;

an exhaust duct extending from the opening in the top wall, wherein the exhaust duct includes an inlet portion extending through the aperture in the lid and at least partially into the kettle;

an exhaust fan in fluid communication with the kettle and the exhaust duct, wherein the exhaust fan is configured to remove at least a portion of an effluent from the kettle via the exhaust duct;

an inlet screen covering at least a portion of the opening;

a drive shaft;

a motor configured to rotate the drive shaft;

a paddle disposed in the exhaust duct and coupled to the drive shaft, wherein the paddle is configured to scrape or otherwise remove particles from the inlet screen when rotated by the motor; and an agitator disposed in the kettle and releasably coupled to the paddle and configured to rotate therewith to mix popcorn kernels in the kettle.

2. The machine of claim 1 wherein the kettle is pivotally coupled to the support.

3. The machine of claim 1 wherein the top wall defines a portion of a plenum, and wherein the plenum is configured to receive effluent from the kettle via the opening in the top wall and direct the effluent to a filter.

4. The machine of claim 3 wherein the inlet screen is configured to allow effluent to pass therethrough and further configured to prevent popped corn kernels from entering the plenum.

5. The machine of claim 1, further comprising:
an exhaust fan cavity configured to house the exhaust fan; and
a filter system positioned upstream of the exhaust fan cavity in fluid communication with the kettle, wherein the filter system includes one or more filters.

6. The machine of claim 5 wherein the one or more filters includes at least one of a baffle filter, a ionizing filter, and a charcoal filter.

7. A popcorn machine, comprising:
a cabinet including an interior portion having a wall with an opening therein;
a screen covering at least a portion of the opening;
a kettle operationally positioned within the interior portion of the cabinet, wherein the kettle is configured to receive and heat popcorn kernels;
an exhaust duct extending from the opening toward the kettle, a scraping member disposed in the exhaust duct;
an agitator disposed in the kettle; and
a motor operationally coupled to the scraping member and the agitator, wherein operation of the motor rotates the scraping member to remove particles on the screen and rotates the agitator to mix popcorn kernels in the kettle.

8. The popcorn machine of claim 7, further comprising an exhaust fan in fluid communication with the kettle and the exhaust duct, wherein the exhaust fan is configured to remove at least a portion of effluent from the kettle via the exhaust duct.

9. The popcorn machine of claim 7, further comprising a kettle lid configured to at least partially cover the kettle during popcorn kernel heating, wherein the lid includes an aperture therethrough, and wherein the exhaust duct extends at least partially into the kettle through the aperture in the lid.

10. The popcorn machine of claim 7 wherein the exhaust duct has a first diameter, and wherein the agitator has a second diameter greater than the first diameter.

11. The popcorn machine of claim 7, further comprising a drive shaft configured to operationally couple the motor to the scraping member and the agitator, wherein the screen includes an aperture, and wherein the drive shaft extends through the aperture into the exhaust duct.

* * * * *